(12) United States Patent
McCabe

(10) Patent No.: US 8,203,310 B2
(45) Date of Patent: Jun. 19, 2012

(54) ENERGY STORAGE MODULE FOR LOAD LEVELING IN LIFT TRUCK OR OTHER ELECTRICAL VEHICLE

(75) Inventor: Paul Patrick McCabe, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 570 days.

(21) Appl. No.: 12/254,368

(22) Filed: Oct. 20, 2008

(65) Prior Publication Data

US 2010/0097029 A1    Apr. 22, 2010

(51) Int. Cl.
*H02J 7/00* (2006.01)

(52) U.S. Cl. .................. 320/132; 320/167

(58) Field of Classification Search ............ 320/132
See application file for complete search history.

(56) References Cited

U.S. PATENT DOCUMENTS

| | | | |
|---|---|---|---|
| 5,218,284 A | 6/1993 | Burns et al. | |
| 5,493,492 A * | 2/1996 | Cramer et al. | 705/32 |
| 6,075,331 A * | 6/2000 | Ando et al. | 318/376 |
| 6,373,152 B1 | 4/2002 | Wang et al. | |
| 6,559,621 B2 | 5/2003 | Corless et al. | |
| 6,650,091 B1 | 11/2003 | Shiue et al. | |
| 6,836,097 B2 | 12/2004 | Turner et al. | |
| 6,938,733 B2 | 9/2005 | Eilinger | |
| 7,038,427 B2 | 5/2006 | Kok et al. | |
| 7,085,123 B2 | 8/2006 | Shiue et al. | |
| 7,186,473 B2 | 3/2007 | Shiue et al. | |
| 2002/0171397 A1 | 11/2002 | Adrian et al. | |
| 2005/0077880 A1 * | 4/2005 | Turner et al. | 320/166 |
| 2006/0044148 A1 * | 3/2006 | Daniels et al. | 340/686.1 |
| 2006/0098390 A1 * | 5/2006 | Ashtiani et al. | 361/502 |
| 2006/0133003 A1 | 6/2006 | Kular et al. | |
| 2006/0222916 A1 * | 10/2006 | Norimatsu et al. | 429/23 |
| 2006/0231302 A1 | 10/2006 | Rose | |
| 2007/0072014 A1 * | 3/2007 | Kim et al. | 429/7 |
| 2007/0075677 A1 * | 4/2007 | Alvarez-Troncoso | 320/104 |
| 2007/0090808 A1 * | 4/2007 | McCabe et al. | 320/137 |
| 2007/0114846 A1 * | 5/2007 | Pavlovic | 307/9.1 |
| 2007/0182362 A1 | 8/2007 | Trainor et al. | |
| 2008/0106239 A1 * | 5/2008 | Cegnar | 320/167 |
| 2008/0238394 A1 * | 10/2008 | Hasegawa et al. | 323/283 |
| 2008/0246443 A1 * | 10/2008 | Doljack | 320/167 |
| 2008/0309285 A1 * | 12/2008 | Choksi et al. | 320/106 |
| 2009/0020346 A1 * | 1/2009 | Krauer et al. | 180/65.2 |
| 2010/0079109 A1 | 4/2010 | Eilertsen et al. | |

* cited by examiner

*Primary Examiner* — Arun Williams
(74) *Attorney, Agent, or Firm* — Quarles & Brady LLP

(57) ABSTRACT

An energy storage module for use in an electric vehicle, such as a lift truck, is disclosed. The energy storage module includes a bank of super capacitors or ultra-capacitors which are connected between the battery and the load. In operation, the energy storage module charges the capacitors, and uses the charged capacitors to level the load on the battery, limiting spikes in current draw, and assuring a substantially smooth discharge profile, wherein the battery discharge is substantially steady state. The energy storage module further includes sensors for determining when the battery and load are connected.

24 Claims, 7 Drawing Sheets

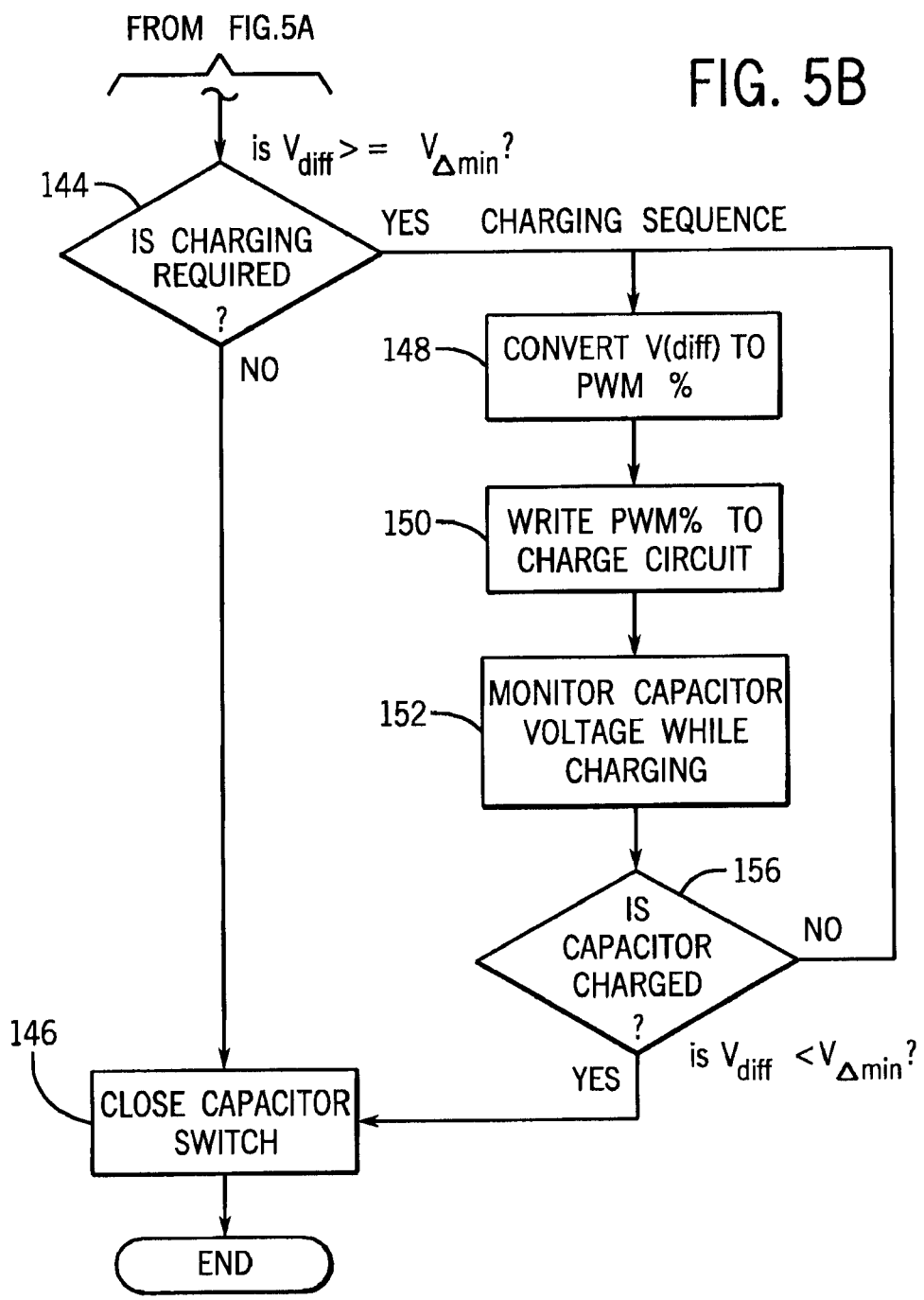

ENERGY STORAGE MODULE FOR LOAD LEVELING IN LIFT TRUCK OR OTHER ELECTRICAL VEHICLE

CROSS-REFERENCE TO RELATED APPLICATION

Not applicable.

STATEMENT CONCERNING FEDERALLY SPONSORED RESEARCH OR DEVELOPMENT

Not applicable.

FIELD OF THE INVENTION

The present invention relates to load leveling of an electrical vehicle using super-capacitors or ultra-capacitors, and more particularly to battery-powered lift trucks that include capacitive elements for leveling the electrical load.

BACKGROUND OF THE INVENTION

Lift trucks, material handling and industrial vehicles, and other types of vehicles are frequently constructed using electric motors. To power these vehicles, electric storage batteries, typically lead-acid batteries, are used. These batteries are typically sized to provide sufficient charge for a work shift or other defined period, so that the vehicle remains sufficiently charged during the entire work shift, and can be recharged when the shift is complete.

It is desirable, however, to extend the useful charge life of the battery between off-duty charging cycles. To meet this need a number of different systems have been developed. One method for extending the charge of the battery is known as opportunity charging. In opportunity charging, the truck is plugged into a charger during breaks or other non-work periods, to allow for recharging of the battery. This method is helpful in increasing the efficiency of the vehicle, but requires the installation of high kilowatt electrical service throughout a facility, which is both expensive and space-intensive. Moreover, opportunity charging returns only between about five and ten percent of battery charge during an operator break, thereby providing a relatively low return on a significant investment. Additionally, the charging is relatively slow, requiring the vehicle to sit for a significant period of time.

Another method for extending the life of a battery during use is known as fast charging. In fast charging, a large battery charger that operates at two to three times the output of the current as a regular battery charger is used. These devices can deliver, for example, four hundred to six hundred amperes during work breaks, and therefore deliver a significantly higher amount of energy to the battery in a reduced time as compared to regular chargers. Fast charging, however, requires alteration to the vehicle to permit the use of special connectors installed on the battery. As with opportunity charging, significant and expensive alterations must be made to the facility to enable charging. Furthermore, the concentrated application of charge to the battery results in significant heating of the battery, and the elevated temperature can be detrimental to the life of the battery.

There remains a need, therefore, for an inexpensive, and efficient method for maintaining the charge on a battery during use. The present invention addresses these issues.

SUMMARY OF THE INVENTION

In one aspect, the present invention provides a method for maintaining a level of charge between a battery and a load during operation of an electrical vehicle. The method comprises the steps of connecting a bank of super capacitors between an electrical load and a battery supplying power to the load, sensing a connection between the bank of super capacitors and the battery and between the bank of super capacitors and the load, isolating the super capacitors from the battery, and measuring a battery voltage at the battery and a capacitor voltage at the bank of super capacitors. A voltage difference is calculated between the battery voltage and the capacitor voltage, and the capacitor bank is charged when the voltage difference is greater than a predetermined minimum voltage level. When the super capacitors are charged, they supplement the current draw by the load, thereby reducing the rate of discharge from the battery to the electrical load.

In another aspect of the invention, an energy storage module for providing load leveling between a battery and an electrical load is provided. The energy storage module includes a battery connector for providing an electrical connection to a battery, and a load connector for connection to the electrical load. The battery connector and the load connector each including corresponding sensing device for sensing a connection. A bank of super capacitors are connected between the electrical connector to the battery and the electrical connector to the load, and a controller is connected to the battery connector, the load connector, and the bank of super capacitors. The controller is programmed to monitor the battery connector sensing device and the load connector sensing device, sense a battery voltage level and a capacitor voltage level when the battery connector sensing device and the load connector sensing device indicate that the battery connector and the load connector are connected, and to calculate a voltage difference between the battery voltage level and the capacitor voltage level. The controller compares the voltage difference to a predetermined minimum voltage value, and charges the super capacitor bank when the voltage difference is greater than the predetermined minimum. Therefore, when the bank of super capacitors is charged, the charge stored in the bank of super capacitors can be drawn by the electrical load, thereby limiting the current draw from the battery, and increasing the usable battery time between charges.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE DRAWINGS

FIGS. 5A and 5B are a flow chart illustrating one embodiment of a charging sequence for use in the lift truck of FIG. 1.

DETAILED DESCRIPTION OF THE PREFERRED EMBODIMENT

The present invention provides a method and apparatus for leveling an electrical load in an electrical vehicle supplied by, for example, a battery, a fuel cell, or a combination of these and other types of power supplies. Generally, an energy storage module 57 (FIG. 2) is connected between an electrical power supply 37 and an electrical load 70, as described more fully below. The energy storage module 57 includes a bank of ultra or super-capacitors. As is known in the art, these ultra-capacitors or super capacitors are electrochemical capacitors characterized by a much greater energy density and power per pound than typical electrostatic and electrolytic capacitors, typically on the order of thousands of times greater than a high-capacity electrolytic capacitor.

Figure 1:
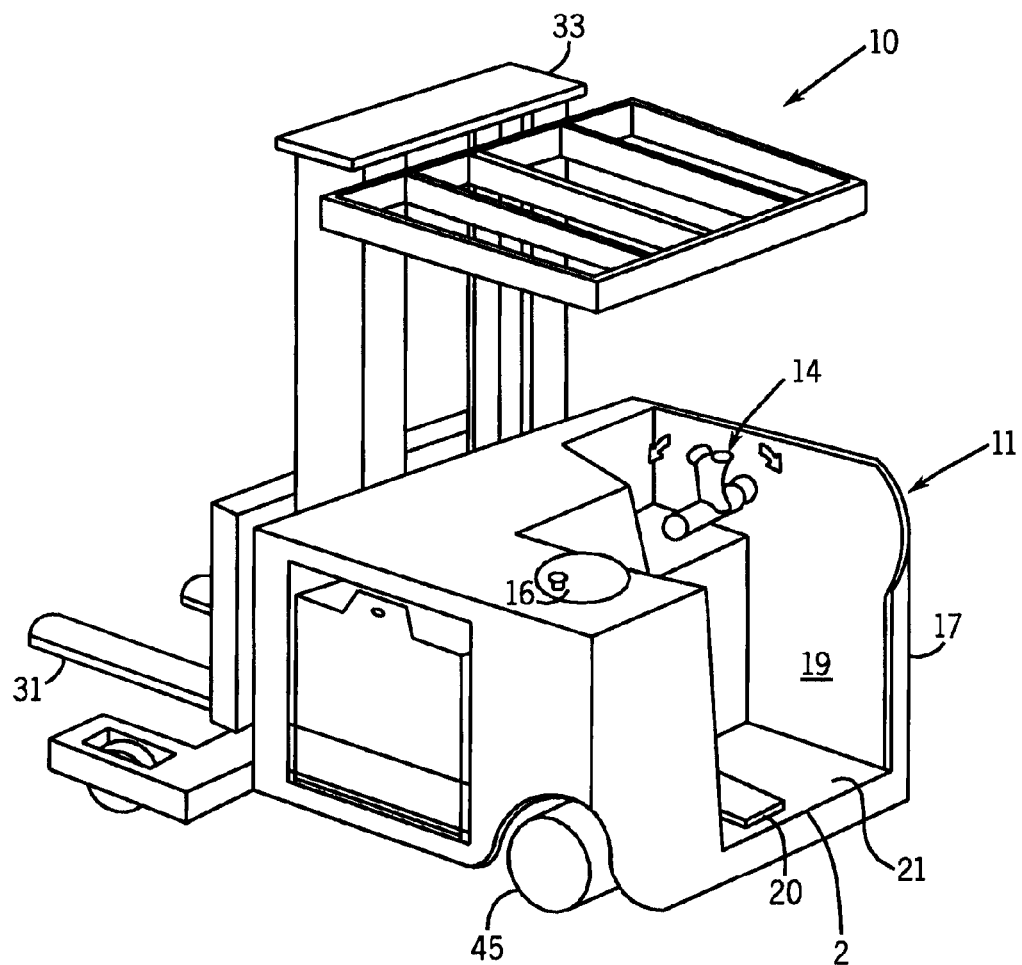
FIG. 1 is a perspective view of a lift truck that can include the pallet counter system constructed in accordance with the present invention.

Referring now to the Figures, and more particularly to FIG. 1, one embodiment of a material handling vehicle or lift truck 10 which incorporates the present invention is shown. The material handling vehicle 10 includes an operator compartment 11 comprising a body 17 with an opening 19 for entry and exit of the operator. The compartment 11 includes a control handle 14 which is mounted to the body 17 at the front of the operator compartment 11 proximate the forks 31, and a floor switch 20 positioned on the floor 21 of the compartment 11. A steering wheel 16 is also provided in the compartment 11. Although the material handling vehicle 10 as shown by way of example as a standing, fore-aft stance operator configuration lift truck, it will be apparent to those of skill in the art that the present invention is not limited to vehicles of this type, and can also be provided in various other types of material handling and lift truck configurations. Furthermore, although the charging device of the present invention is described and shown in conjunction with a reach truck, it will be apparent that the present invention can be implemented on any lift truck vehicle that includes a fork intended for moving pallets and loads of material, and can also be implemented in other types of electrical vehicles including without limitation electrical cars, golf carts, wheel chairs, and other devices.

Figure 2:
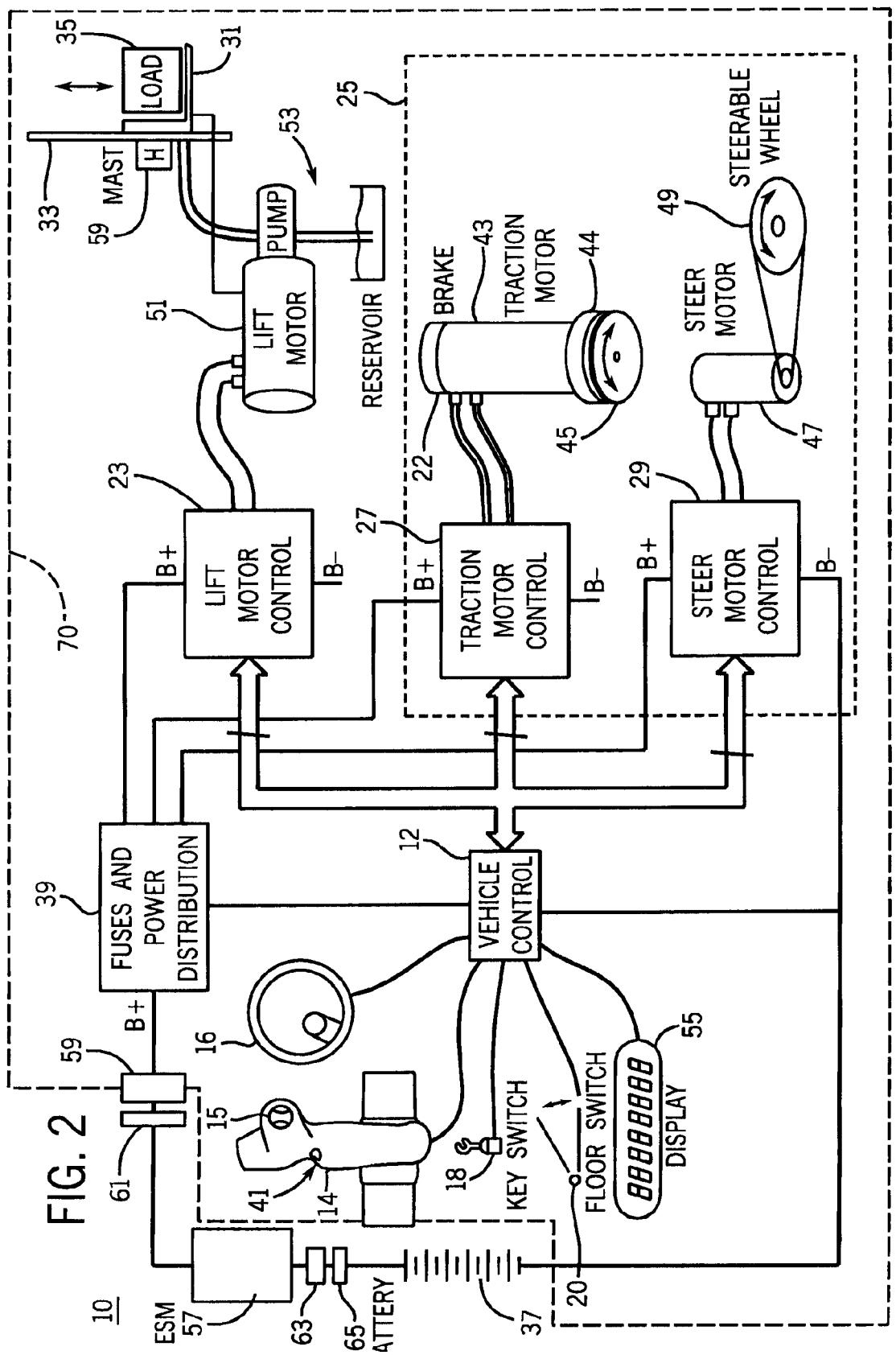
FIG. 2 is a block diagram of a control system of the lift truck of FIG. 1.

Referring now to FIG. 2, a block diagram of a control system for the lift truck 10 which incorporates the present invention is illustrated. Generally, the electrical load 70 of the lift truck 10 includes a vehicle control system 12 and associated actuators and motors. These are powered by a power supply which, as shown here, can include one or more battery 37, or a battery in combination with a fuel cell or other power supply devices. The battery 37 is connected to the electrical load 70 through the energy storage module 57 which, as discussed above, includes a plurality of ultra-capacitors or super-capacitors which are used to level the draw of current from the battery 37 to the vehicle electrical load 70.

Referring still to FIG. 2, the electrical load 70 of the lift truck 10 includes the vehicle control system 12, which receives operator input signals from electrical components including the operator control handle 14, the steering wheel 16, a key switch 18, and the floor switch 20 and, based on the received signals, provides command signals to each of a lift motor control 23 and a drive system 25. The vehicle control 12 can also provide data to a display 55 for providing information to the operator.

Referring still to FIG. 2, the drive system 25 includes a traction motor control 27 and a steer motor control 29. The traction motor control 27 drives one or more traction motor 43 which is connected to a wheel 45 to provide motive force to the lift truck 10. The speed and direction of the traction motor 43 and associated wheel is selected by the operator from the operator control handle 14, and is typically monitored and controlled through feedback provided by a speed/distance sensor 44 which can be an encoder or other feedback device coupled to the traction motor 43. The wheel 45 is also connected to friction brake 22 through the traction motor 43, to provide both a service and parking brake function for the lift truck 10. The traction motor 43 is typically an electric motor, and the associated friction brakes 22 can also be electrically operated devices. The steer motor control 29 is connected to drive a steer motor 47 and associated steerable wheel 49 in a direction selected by the operator by rotating the steering wheel 16, described above.

The lift motor control 23 provides command signals to control a lift motor 51 which is connected to a hydraulic circuit 53 for driving the forks 31 along the mast 33, thereby moving the load 35 up or down, depending on the direction selected at the control handle 14. The drive system 25 provides a motive force for driving the lift truck 10 in a selected direction.

The electrical load 70 of the lift truck 10 is, as described above, powered by one or more battery 37, typically connected to the load 70 through a bank of fuses or circuit breakers 39. The battery 37 includes a battery connector 59 that mates to a mating connector 65 connecting to the load 70. The energy storage module 57 is connected between the battery 37 and the electrical load 70, and includes a first connector 61 that mates to the battery connector 59 and a second connector 63 that connects to the mating connector 65. The energy storage module 57, therefore, can be connected with an existing electrical system, and when removed, the load connector 65 can be reconnected directly to the battery connector 59 to provide a direct connection between the battery 37 and the electrical load 70. Because of these connections, the energy storage module 57 can be selectively connected or removed from the truck circuitry.

Figure 3A:
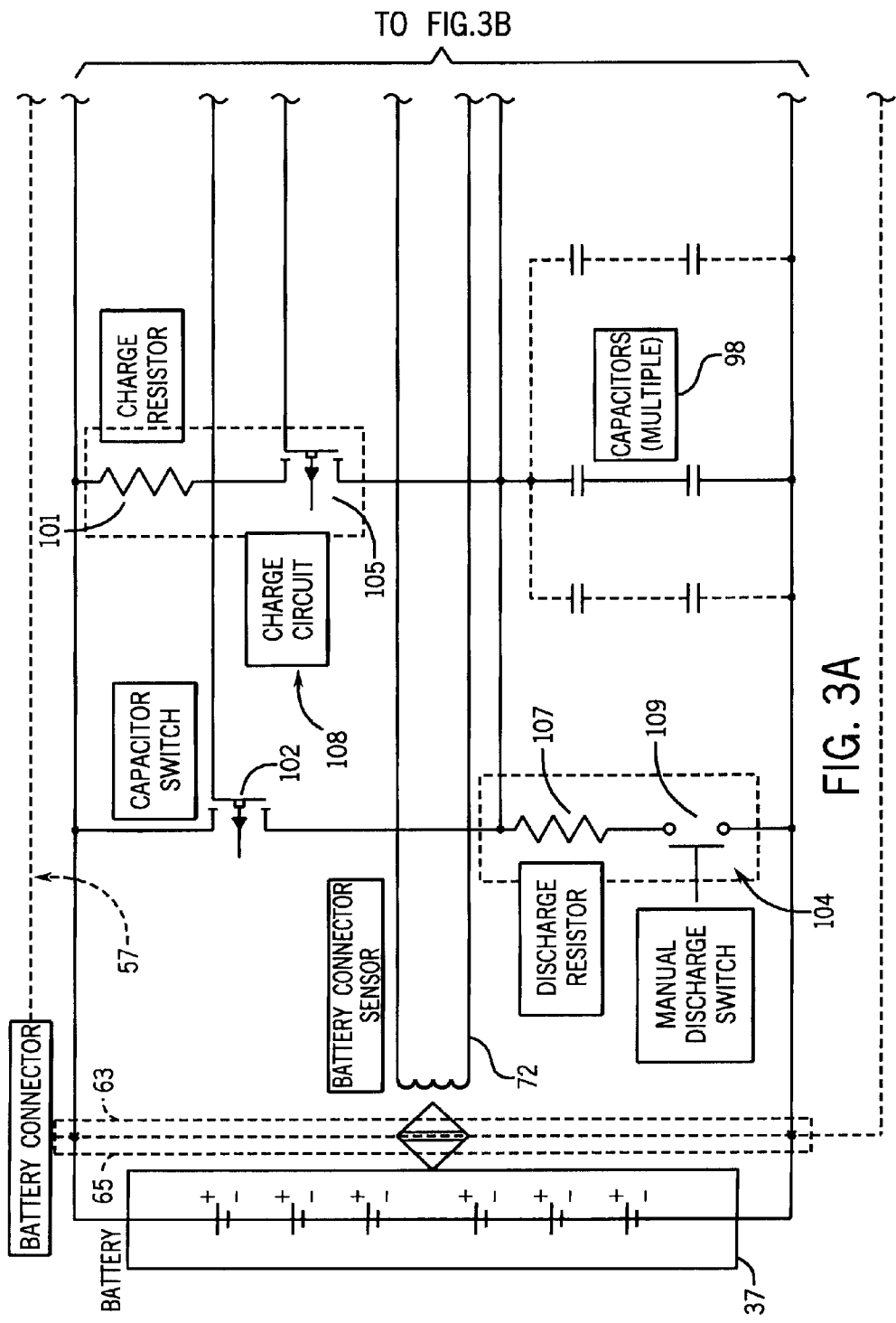
FIGS. 3A and 3B are a simplified circuit diagram of the energy storage module of FIG. 2.
Figure 3B:
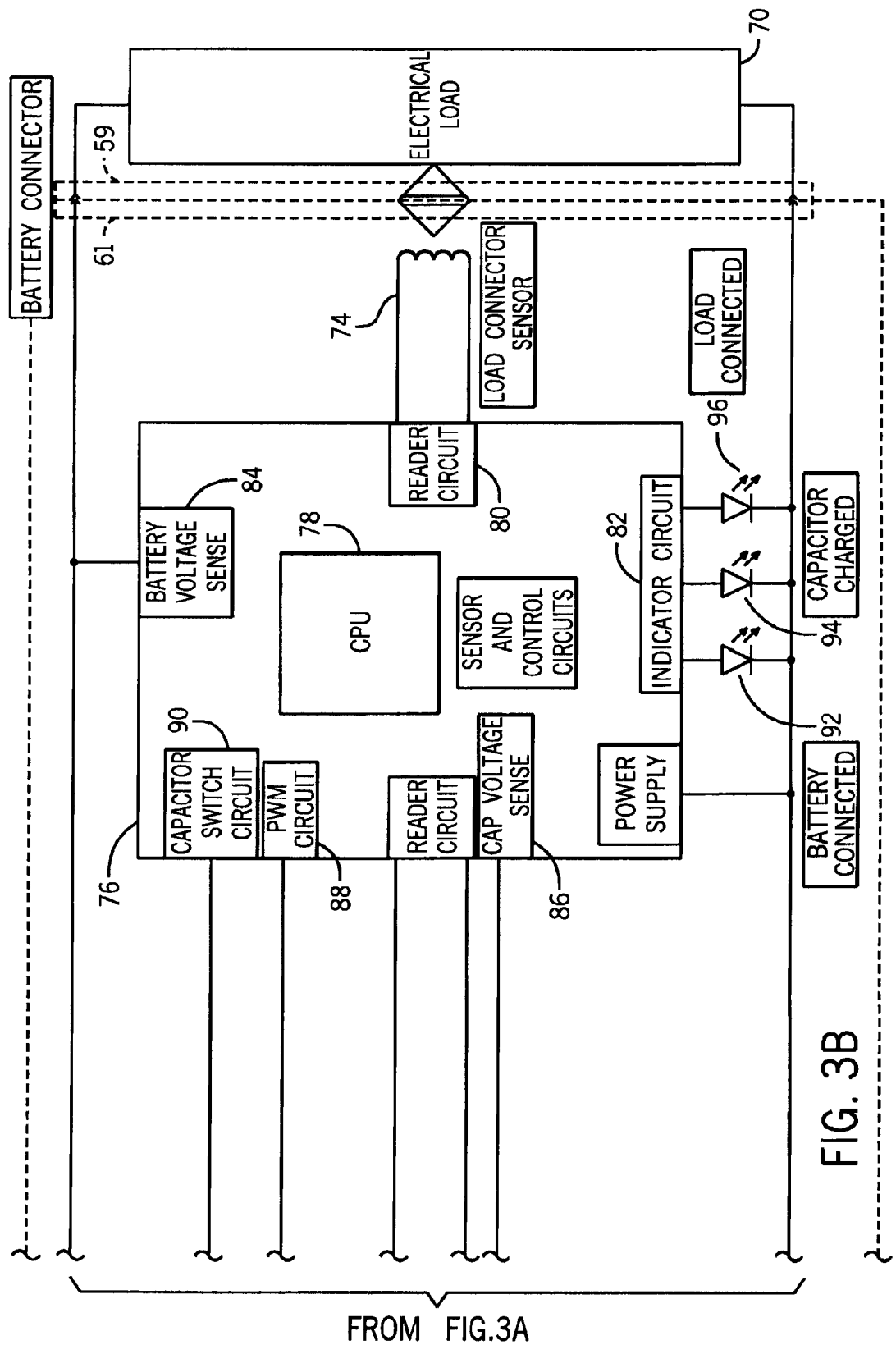

Referring now to FIGS. 3A and 3B, a block diagram illustrating the components of the energy storage module 57 of the present invention is shown. The energy storage module 57 generally includes a controller or control circuit 76, including a central processing unit 78 which can be, for example, a microprocessor or microcontroller. The controller 76 further includes a battery voltage sensing circuit 84, a capacitor switch circuit 90, a pulse width modulation circuit 88, a capacitor voltage sensing circuit 86, and a light indicator circuit 82. The controller 76 controls the charging of a capacitor bank 98, as described below, and monitors feedback from connectors 61 and 63, which connect the energy storage module 57 between the electrical load 70 and the battery 37, as described above.

Referring still to FIGS. 3A and 3B, each of the pairs of connectors to the energy storage module, 63 and 65 and 61 and 59, include a sensor device and associated reader which can be read by the controller 76 of the energy storage module 57 to sense the presence of a connection to each of the battery 37 and the electrical load 70, or to identify the connected battery 37 or the lift truck 10. For example, an RFID tag can be provided on the battery connector 65 and load connector 59, and associated RFID readers 72 and 74 on the connectors 63 and 61 to the energy storage module 57, respectively. Similarly, a magnet can be coupled to the connectors 65 and 59, and the reader devices 72 and 74 can comprise Hall sensing devices connected to each of the connectors 63 and 61. Proximity sensor, or other types of identifying or sensing components can be similarly provided on the connectors 65 and 59, and an associated reader or sensor 72 and 74 provided on the mating connectors 63 and 61, or otherwise connected to the controller 76. Irrespective of the type of device used, the controller reads signals from the sensing devices 72 and 74 to determine when the battery 37 and electrical load 70 are connected to the energy storage module 57, as discussed more fully below. When the sensing devices are capable of identifying the battery 37 or vehicle 10, the controller can store the identity data, and this data can be retrieved, for example, for maintenance analysis, or other reasons.

Referring still to FIGS. 3A and 3B, as described above, the controller 76 is further connected to a bank of ultra or super capacitors 98 connected in series between the positive and negative terminals of the battery 37 through the capacitor switch 102. As shown here, depending on the voltage and current requirements of the battery 37 and associated electrical load 70, the bank of capacitors 98 can also optionally include multiple banks of series-connected capacitors connected in parallel.

Referring still to FIGS. 3A and 3B, the bank of ultra or super capacitors 98 are connected between the positive and negative terminals of battery 37 through a charging circuit 103, here shown generally as a resistor 101 and MOSFET switching device 105 controlled by the pulse width modulation circuit 88 in controller 76. A discharge circuit 104 including both a discharge resistor 107 and manual discharge switch 109 are connected in parallel with the capacitor bank 98. When activated, the switch is closed to provide a current path from the capacitor bank 98, through the associated discharge resistor, to ground, thereby allowing discharge of the capacitor bank 98, particularly, for example, when maintenance is required and it is necessary to discharge the capacitors. A capacitor switch which, as shown here, can be a semiconductor device such as a MOSFET 102, is selectively activated to connect the bank of capacitors 98 between the positive and negative terminals of the battery 37. The control circuit 76 further includes a capacitor voltage sensing circuit 86 and a battery voltage sensing circuit 84, for sensing the voltage in each of the battery 37 and capacitor bank 98. A bank of indicator lights, here shown as light emitting diodes 92, 94 and 96, is selectively activated by the controller 76 to provide an indicator when the battery 37 is connected, when capacitor bank 98 is charged, and when the electrical load 70 is connected to the energy storage module 67, respectively.

Figure 5A:
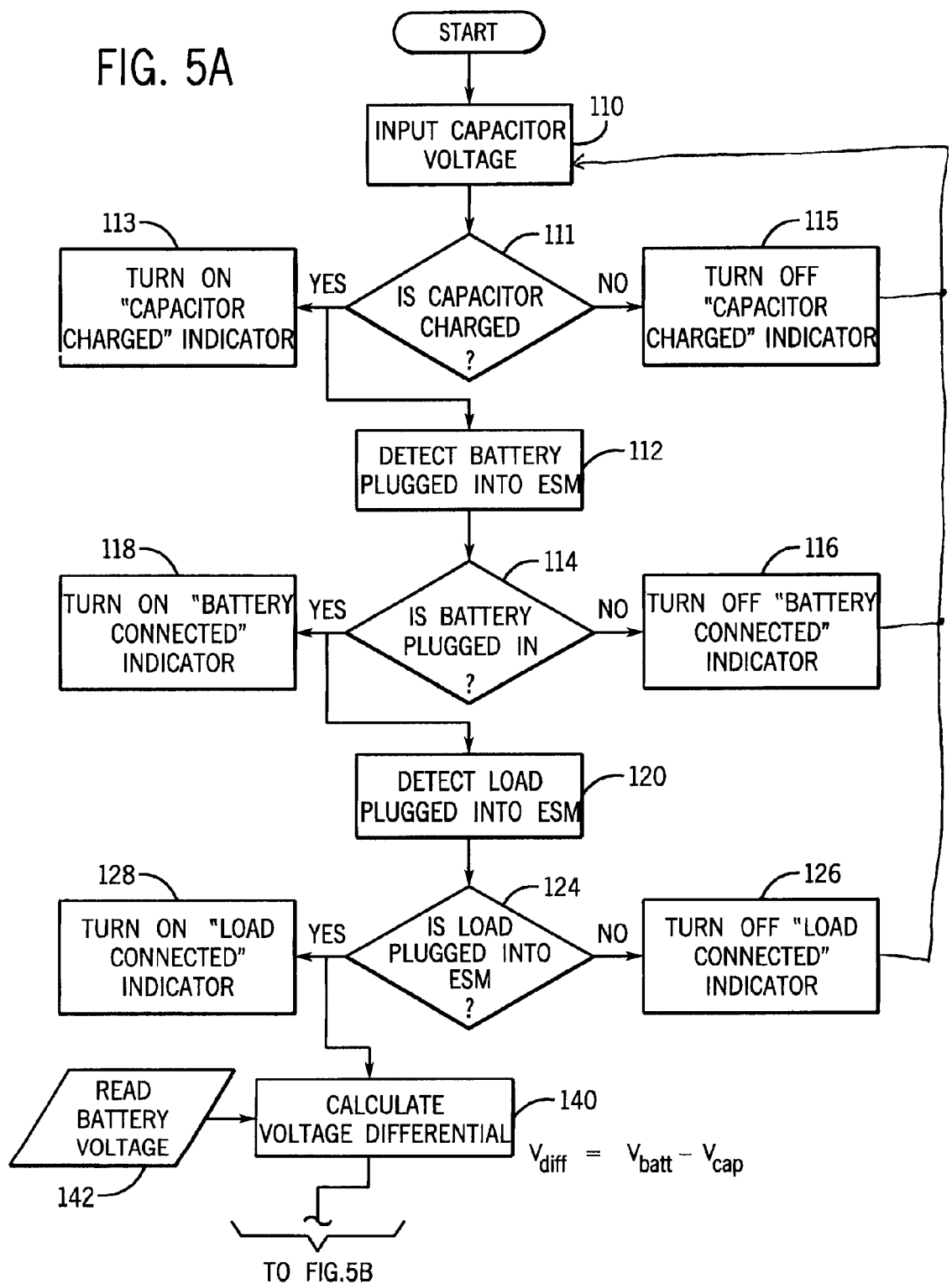

Referring now to FIGS. 5A and 5B, a flow chart illustrating the operation of the energy storage module 57 as controlled by controller 76 is shown. Initially, in process step 110, the controller 76 reads the voltage on the capacitors 98 by referencing the voltage at the capacitor sense circuit 86. At step 111 the controller 76 determines whether the capacitor bank 98 is charged. If the capacitor bank is charged, at process step 113, the "capacitor charged" indicator 94 is illuminated. If the capacitor is not charged, the indicator 94 is deactivated at process step 136.

In either case, at step 112, the controller 76 reads the sensor 72 associated with the plug 65 connected to the battery 37 and in step 114 determines whether the battery 37 is connected to the energy storage module 57. If not, the battery indicator light 92 is deactivated in step 116, the capacitor switch 102 is held open to isolate the capacitors 98 from the battery 37 and to preserve charge on the capacitors 98, and the process returns to step 110. If a connection to the battery 37 is found, the indicator 96 is turned on in step 118, and the process moves on to step 120, where the controller 76 reads sensor 74 to determine whether the load connector 61 is connected to the energy storage module 57. If the load connector 61 is not connected, the load connector indicator 96 is turned off in step 126, the capacitor switch 102 is held open, and the controller 76 loops back to step 112. The processor 76 therefore continues to read the inputs at sensors 72 and 74 until both the battery connector 65 and load connector 61 are connected to the controller 76.

If the load connector 61 is connected, the load connector indicator 96 is activated in step 128. At this point, the sensors 72 and 74 indicate that the electrical load 70 and the battery 37 are connected, and therefore that the energy storage module 57 is connected to the truck electrical system. The controller 76, therefore, advances to step 140, where a voltage difference is calculated as the difference between the battery voltage detected at process step 142 and the capacitor voltage as determined at process step 110. At step 144, the voltage difference calculated from step 140 is compared to a minimum predetermined voltage, calculated based on the wattage capacity of the components used in the capacitor circuit. Particularly the voltage difference value is determined to be small enough such that, when the capacitor switch is closed, the peak current flowing between the battery 37 and the capacitor will be at a level that will not stress the components. For example, if the predetermined minimum voltage is half a volt, and the internal resistance of the capacitors is 0.001 ohms, the peak current will be 500 amps when the capacitor switch closes, and will decrease rapidly until the capacitor voltage and battery voltage are equal.

Figure 4:
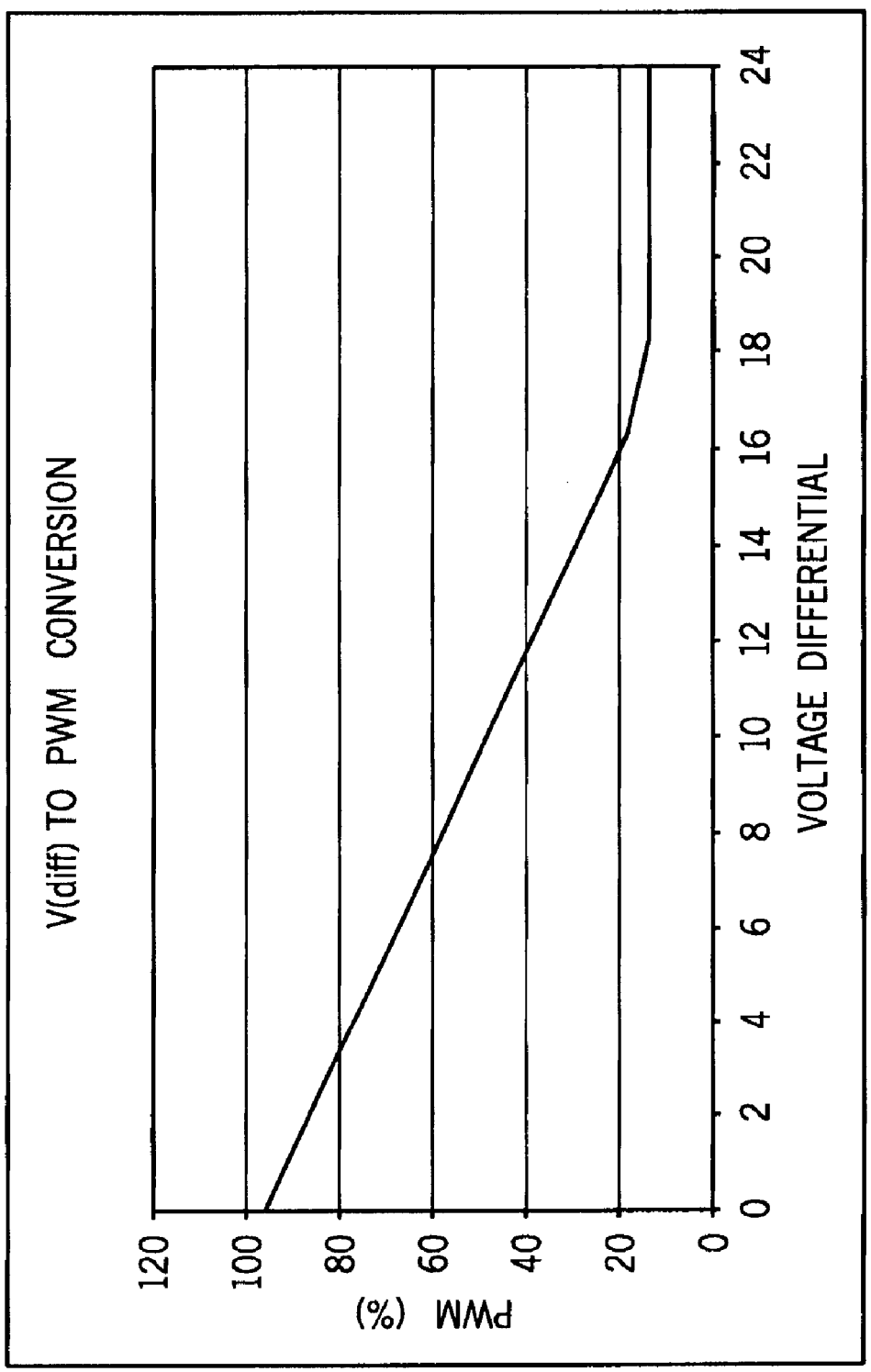
FIG. 4 is a graph correlating a pulse width modulation duty cycle to a voltage difference level for charging the capacitors of the energy storage module of FIG. 2.

If the difference is greater than the minimum voltage value, charging is required and the process moves to step 148, where the difference is correlated to a pulse width modulation duty cycle as shown in the chart of FIG. 4. This duty cycle, in step 150 is applied to the pulse width modulated charge circuit 88 at controller 76, which controls the switch 105 associated with charge circuit 103. In step 152, the capacitor voltage is monitored as the pulse width modulated charging sequence is applied. At step 156, the capacitor voltage is once again read, as described above with respect to step 110, and the process loops back to step 148 to continue charging the capacitor bank 98 until the voltage difference is less than the predetermined voltage minimum. When the capacitor 98 is charged, in process step 146, the controller 76 ends the charging process by opening the switch in charge circuit 103, and closing the capacitor switch 102. The capacitors 98 are therefore connected in parallel across the battery 37, between the positive and negative terminals, and can be used to level the current draw from the load 70, as described below.

In operation, when the capacitors 98 are charged, the energy storage module 57 provides leveling of the draw of the electrical load 70 to enhance energy delivery from the battery 37. Depending on the application, the energy storage module 57 can further absorb transient energy from the vehicle load 70 during regenerative braking or regenerative lowering, and quickly discharges the battery when high instantaneous current is required, reducing the stresses that would otherwise be imposed on the battery 37. By reducing the rate of discharge of the battery 37 and smoothing out the discharge profile, the battery 37 is discharged essentially in a steady state, thereby reducing spikes in current that would otherwise heat the battery, and allowing the battery to run cooler. As a result, the length of usable time per battery charge is increased, and the overall life of the battery is increased.

Although preferred embodiments have been shown and described, it will be apparent that various modifications can be made to the features described above. For example, although the energy storage module is described herein for use with a lift truck, it will be apparent to those of ordinary skill in the art that the storage module of the present invention can be used in other types of battery powered electrical vehicles. Additionally, although the power supply shown here is a battery 37, it will be apparent that power supplies that include fuel cells and regenerative power as, for example, by recovering energy from lifting and lowering the forks 31, can be used in the present invention in addition to a battery alone system.

To apprise the public of the scope of this invention, the following claims are made:

I claim:

1. A method for maintaining a level of charge between a battery and a load in an electrical vehicle, the method comprising the following steps:
   connecting a bank of super capacitors between an electrical load and the battery supplying power to the load;
   isolating the super capacitors from the battery, while the battery remains in the circuit and is capable of providing power to the load;
   measuring a battery voltage at the battery;
   measuring a capacitor voltage indicating the voltage on the bank of super capacitors;
   calculating a voltage difference between the battery voltage and the capacitor voltage; and
   charging the super capacitors when the voltage difference is greater than a predetermined minimum voltage, wherein the charged super capacitors reduce the rate of discharge from the battery to the electrical load.

2. The method as recited in claim 1, wherein the step of charging the bank of super capacitors comprises applying a pulse width modulated charging voltage to the super capacitor bank.

3. The method as recited in claim 1, further comprising the step of sensing a connection between the bank of super capacitors and the battery using a battery connector sensor between the bank of super capacitors and the battery, and sensing a connection between the bank of super capacitors and the load using a load connector sensor between the bank of super capacitors and the load.

4. The method as recited in claim 3, further comprising the step of illuminating a battery connected indicator light when the connection between the bank of super capacitors and the battery is sensed.

5. The method as recited in claim 3, further comprising the step of illuminating a load connected indicator light when the connection between the bank of super capacitors and the load is sensed.

6. The method as recited in claim 1, further comprising the step of illuminating a capacitor charged indicator light when the super capacitor bank is charged to a predetermined level.

7. An energy storage module for providing load leveling between a battery and an electrical load in an electrical vehicle, the energy storage module comprising:
   a battery connector for providing an electrical connection to a battery;
   a load connector for connection to the electrical load;
   a load connection sensing device between a bank of super capacitors and the load for sensing a connection between the super capacitors and the load;
   the bank of super of super capacitors connected between the battery and the electrical load;
   and a controller connected the bank of super capacitors, the controller being programmed to:
      sense a battery voltage level and a capacitor voltage level;
      calculate a voltage difference between the battery voltage level and the capacitor voltage level;
      compare the voltage difference to a predetermined minimum voltage value; and
      charge the super capacitor bank when the voltage difference is greater than the predetermined minimum, wherein when the bank of super capacitors is charged, the charge stored in the bank of super capacitors is used to provide power to the load and to limit the draw from the battery, thereby increasing the time between battery charges.

8. The energy storage module of claim 7, wherein the battery connector is located between the battery and the super capacitors and includes a battery connector sensing device, and the load connector is located between the super capacitors and the load and includes the load connector sensing device, and wherein the controller is programmed to monitor the battery connector sensing device and the load connector sensing device, and to sense the battery voltage and the capacitor voltage when the battery connector and the load connector are connected.

9. The energy storage module as recited in claim 8, wherein the battery connector sensing device and the load connector sensing device each comprise an RFID sensing circuit.

10. The energy storage module as recited in claim 8, wherein the battery connector sensing device and the load connector sensing device each comprise a Hall device sensor.

11. The energy storage module as recited in claim 7, further comprising a charged indicator light connected to the controller, and wherein the controller is further programmed to activate the indicator light when the super capacitor bank is charged.

12. The energy storage module as recited in claim 7, further comprising a discharge switch and a discharge resistor coupled in parallel with the super capacitor bank, the discharge switch and the discharge resistor being selectively activated to discharge the super capacitor bank.

13. The energy storage module as recited in claim 7, further comprising a battery indicator light, connected to the controller, the controller being further programmed to activate the battery indicator light when the battery connector sensing device is activated.

14. The energy storage module as recited in claim 7, further comprising a load indicator light, connected to the controller, the controller being further programmed to activate the load indicator light when the load connector sensing device is activated.

15. The energy storage module as recited in claim 7, wherein the controller is programmed to charge the super capacitor bank using a pulse width modulation algorithm.

16. The energy storage module as recited in claim 15, wherein the duty cycle of the pulse width modulation is based on the voltage differential.

17. An electrical vehicle, comprising:
   a power unit, including a battery and an electrical load powered by the battery, the electrical load including a vehicle control system;
   a fork coupled to the power unit, and configured to be elevated and lowered by the vehicle control system;
   an energy storage module selectively connectable and removable between the battery and the load, wherein the energy storage module comprises: a module battery connector and a module load connector, a bank of super capacitors connected between the module battery connector and the module load connector to level the load; and a controller connected to the module battery connector, the module load connector, and the bank of super capacitors, the controller being programmed to:
      sense a battery voltage level and a capacitor voltage level when a battery connector sensing device in a vehicle battery connector connected to the battery and a load connector sensing device in a vehicle load connector connected to the load indicate that the module battery connector is connected to the vehicle battery connector and the module load connector is connected to the vehicle load connector;
      calculate a voltage difference between the battery voltage level and the capacitor voltage level;

compare the voltage difference to a predetermined minimum voltage value; and charge the super capacitor bank when the voltage difference is greater than the predetermined minimum.

18. The electrical vehicle of claim 17, further comprising:
a battery connector reading device in the module battery connector for reading the battery connector sensing device when the module battery connector and the vehicle battery connector are connected;
a load connector reading device in the module load connector for reading the load connector sensing device when the module load connector and the vehicle load connector are connected; and
wherein the controller is further programmed to monitor the battery connector sensing device and the load connector sensing device.

19. The electrical vehicle of claim 17, wherein the vehicle battery connector is configured to removably mate with the vehicle load connector such that the energy storage module is selectively connectable to and disconnectable from the electrical vehicle.

20. The electrical vehicle of claim 17, wherein the controller correlates the voltage difference to a pulse width modulation duty cycle, and charges the capacitor bank using the selected pulse width modulation duty cycle.

21. The electrical vehicle of claim 17, wherein at least one of the battery connector sensing device and the load connector sensing device identify the respective battery connected to the battery connector or the electrical vehicle connected to the load connector.

22. The electrical vehicle of claim 17, wherein at least one of the battery connector sensing device and the load connector sensing device sense connection to the respective battery or the load via a proximity sensor.

23. The electrical vehicle of claim 17, wherein at least one of the battery connector sensing device and the load connector sensing device sense connection to the respective battery or the load via an RFID tag.

24. The electrical vehicle of claim 17, wherein at least one of the battery connector sensing device and the load connector sensing device sense connection to the respective battery or the load via a magnet.

* * * * *